Nov. 10, 1953

J. HALAHAN ET AL 2,658,656

DISPENSING MACHINE

Filed Nov. 22, 1950

INVENTORS
JOHN HALAHAN
THEODORE F. ARONSON
FLOYD A. LYON
BY
John C. McGregor
ATTORNEY

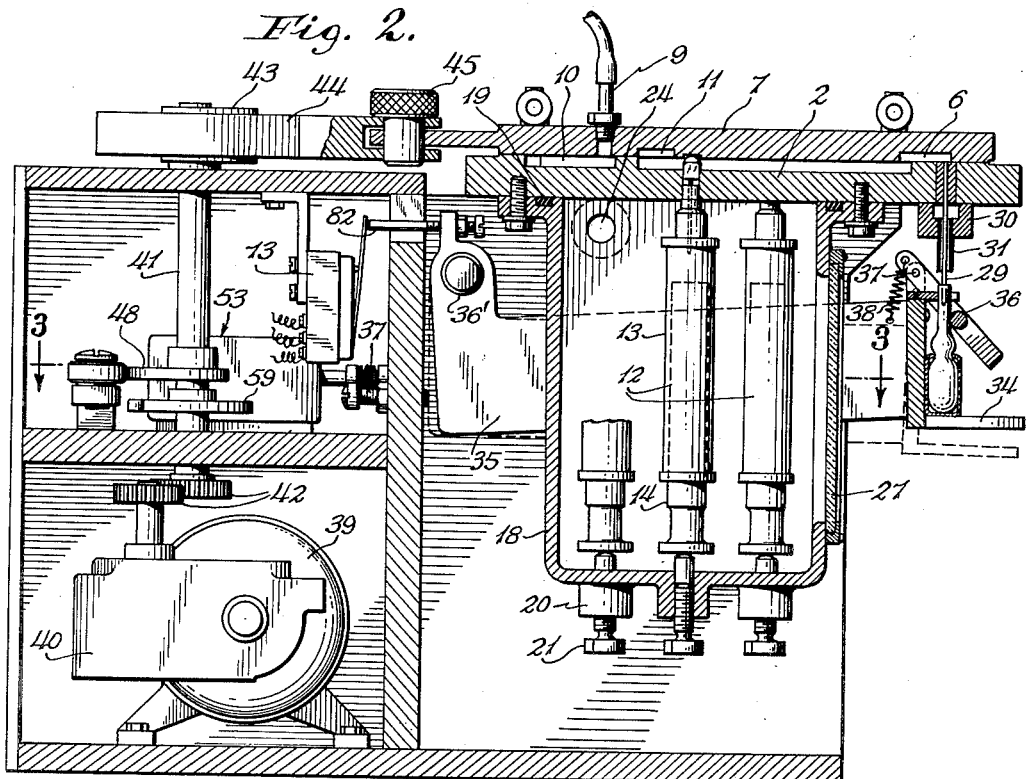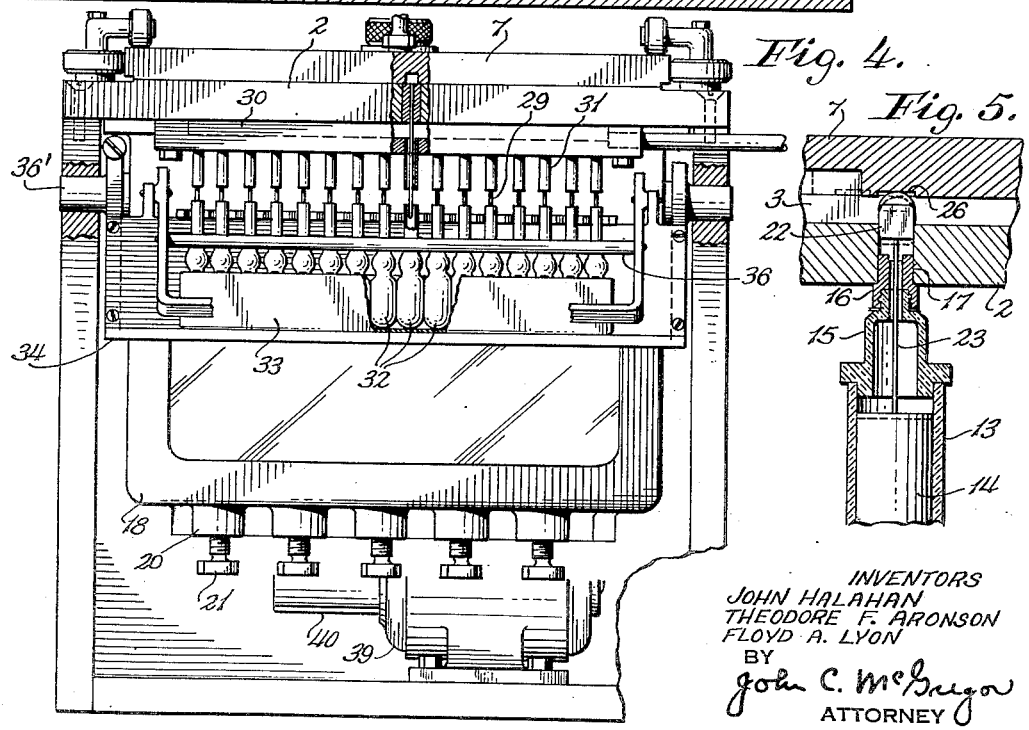

Patented Nov. 10, 1953

2,658,656

UNITED STATES PATENT OFFICE 2,658,656

DISPENSING MACHINE

John Halahan, Jackson Heights, Theodore F. Aronson, Valley Stream, and Floyd A. Lyon, Upper Brookville, N. Y.

Application November 22, 1950, Serial No. 196,992

14 Claims. (Cl. 226—107)

This invention particularly relates to a dispensing machine for loading measured quantities of a fluid such as medicinal or pharmaceutical preparations into ampules or like containers.

It is primarily the object of our invention to provide a dispensing machine which is characterized by its unique and simple design, and its ability to be readily disassembled for cleaning and sterilizing purposes, thereby resulting in a highly efficient and satisfactory machine.

It is another object of the present invention to provide a dispensing machine in which the mechanism for dispensing measured quantities of the fluid or liquid is pneumatically operated, thereby obviating binding of the machine elements and resulting in a proper dispensing operation.

Another object resides in providing a simple mechanism whereby after loading a predetermined measured quantity of fluid into an ampule any excess such as the drop which usually forms on the end of the discharge pipe is sucked back.

Still another object resides in providing a tray upon which the ampules may be supported in aligned relation and which comprises a serrated member against which the ampules may be pressed and thereby placed in alignment with the discharge pipes of the machine, the necks of the ampules fitting within the recesses of the serrate member, thereby being accurately positioned both lengthwise and transversely of the machine.

Still another object resides in providing a machine of the foregoing character which is arranged automatically to carry out one cycle of operation and one cycle only at a time, reliance being placed on the operator to commence a second or successive loading cycle.

With the foregoing and still other objects in view our invention includes the novel elements and the combinations and ararngements thereof described below and illustrated in the accompanying drawings in which—

Fig. 2 is a side elevation view, partly in section, of the machine of Fig. 1;

Fig. 4 is a front elevation view, partially broken away and showing certain details in section;

Fig. 5 is a fragmentary sectional view illustrating a detail; and

Briefly, the machine of the present invention is designed to perform the following cycle or sequences of operations wherein it comprises a fluid or liquid reservoir from which measured quantities of the fluid are loaded into a plurality of ampules. Any excess of fluid which may adhere to the discharge pipe, as a drop of liquid, is then removed by effecting a pressure drop in the discharge passage leading to the discharge pipe. Thereafter the machine reloads the reservoirs from a suitable source of supply of fluid or liquid. This completes a single loading cycle of the machine and at this point the machine is automatically stopped to insure but one cycle of operation thereof at a time.

Figure 1:
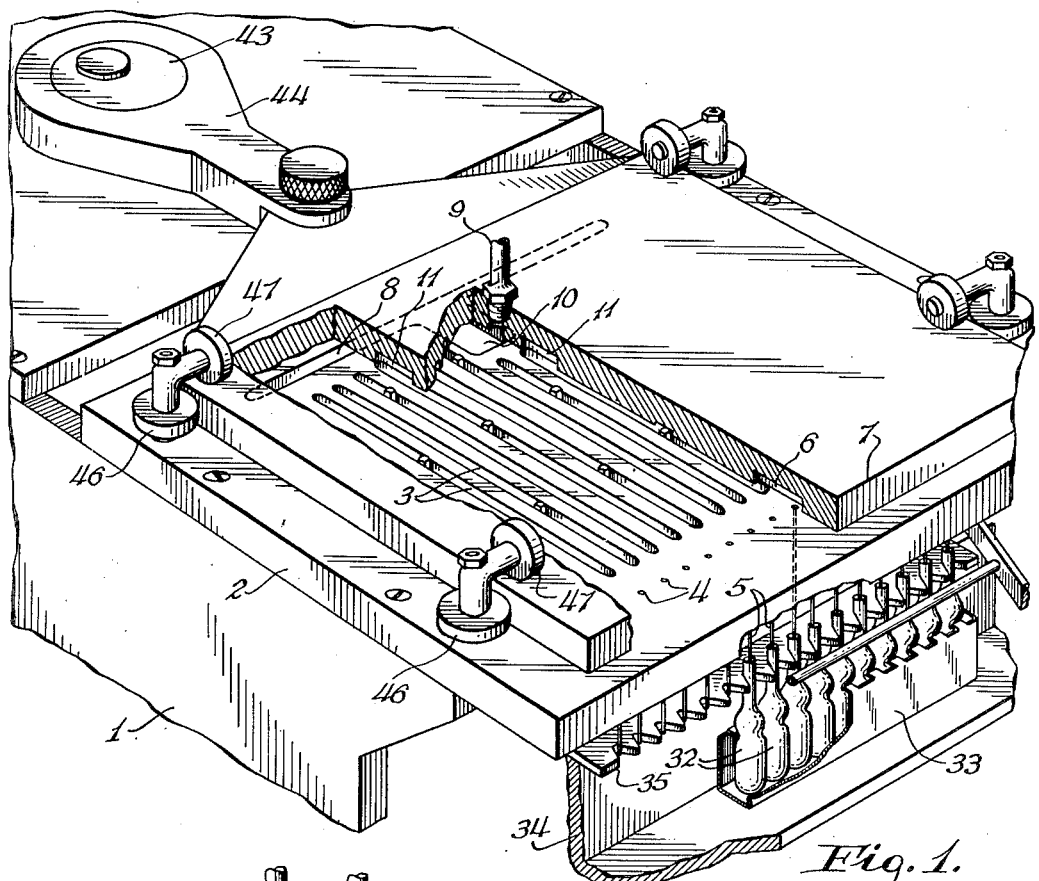
Fig. 1 is a fragmentary perspective view of a preferred form of dispensing machine of the present invention.

Referring now to Fig. 1 wherein we have illustrated a preferred embodiment of our invention. 1 indicates generally a frame upon which the operating mechanisms of the dispensing machine are mounted or supported. The side frame members support a horizontal plate 2 which is provided with a plurality of longitudinally extending grooves 3. Adjacent but spaced from one end of the grooves 3 are a plurality of openings 4 which, as hereinafter described, commence with discharge pipes 5. As clearly illustrated in Fig. 1, the openings 4 are respectively aligned with the grooves 3 and communication therebetween is established by means of grooves 6 in a top plate 7 which is slidably disposed the plate 2 and adapted to be moved longitudinally therealong. In other words, the plate 7 is provided in its lower surface with a row of grooves corresponding in number to the number of grooves 3 in the lower plate and the grooves 6 are of sufficient length as to overlie the openings 4 and one end of the grooves 3 when the plate 7 is properly positioned. A T-shaped groove 8 is also formed in the upper surface of the lower plate 2 and comprises a grooved position which extends transversely of plate 2 and in space relation to the rearward ends of grooves 3. Groove 8 also includes a longitudinal extending portion as shown on Fig. 1. This configuration is illustrated since in the preferred embodiment of our invention we supply fluid from a fluid source, not illustrated, through a flexible conduit 9 to a passageway 10 extending through the upper plate 7. Therefore, fluid from the source may flow into the groove 8, while plate 7 may be reciprocated in a longitudinal direction. The plate 7 is also formed with a second row or group of grooves 11 in its lower surface, which are of sufficient length to overlie the rearward end of the grooves 3 and either the transverse or longitudinal portions of groove 8. When the upper plate 7 is properly positioned in this manner fluid from a source will be continuously supplied to the groove 8 either by gravity or by placing the fluid source under pressure, and movements of the plate 7 longitudinally of plate 2 will serve alternatively to connect groove 8 with all the grooves 3, or, grooves 3 with the openings 4, respectively, which communicate with the discharge pipes 5.

Each of the grooves 3 are separately connected with the fluid reservoir indicated generally at 12, see Fig. 2. A separate reservoir is provided for each groove so that assuming there are 16 grooves we prefer to provide 16 reservoirs from which a measured quantity of fluid or liquid to be dispensed is expelled. Preferably these reservoirs are arranged in a plurality of rows slightly displaced with respect to each other transversely in the machine so as to occupy a small space, and hence these reservoirs will communicate with the grooves at various points along the length thereof. Preferably, the reservoirs comprise a glass cylinder 13 within which is slidably fitted a piston 14. The discharge end of the cylinder may be provided as illustrated particularly in Fig. 5, with a bayonet type coupling 15 which may be slid within and rotated relative to a general coupling 16 which is secured within a passageway 17 in plate 2. In this manner, the cylinders may be readily removed for cleaning and sterilizing purposes. All of the reservoirs are encased within a cover 18 which is adapted to be bolted to the under-surface of plate 2 as shown, a suitable gasket 19 being interposed between the flange of the cover 18 and the under-surface of plate 2. Lugs 20 are formed on the bottom of cover 18 and are drilled and tapped to receive adjusting studs 21 which are adapted to engage the pistons 14 and thereby limit the outward movement thereof during the intake stroke.

Since in accordance with our invention, the pistons 14 are operated pneumatically, we also provide a stop means for limiting the discharge stroke of the pistons and thereby insure that a measured quantity of the liquid or fluid within the cylinders is discharged therefrom. To this end, we provide a piston 22 which is slidably fitted within the passageway 17 and is adapted to project within the grooves 3. The piston 22 is preferably of rounded contour at the upper end thereof in order slidably to co-act with the under-surface of plate 7. Piston 22 is also provided with a slender stem 23 which projects through the hollow female coupling 16 and the male coupling 15 into the interior of the cylinder 13 to provide an abutment or stop for the piston 14.

Figure 3:
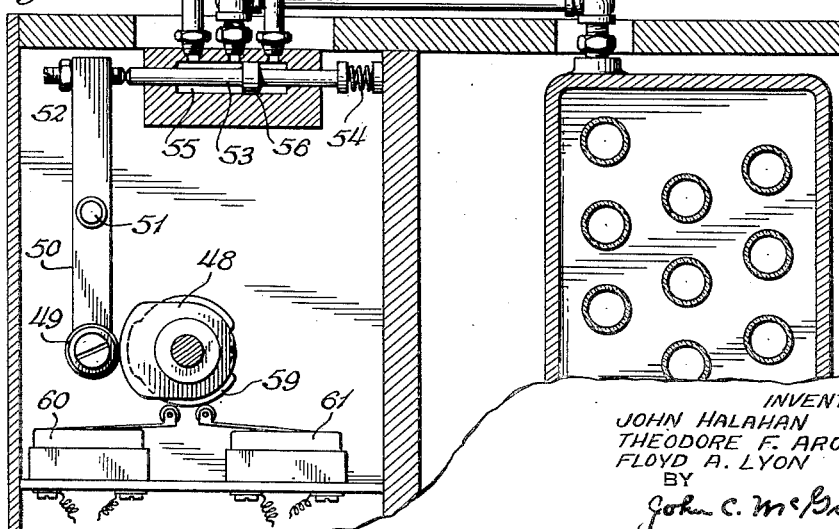
Fig. 3 is a fragmentary sectional plane view of the machine taken in about the plane 3—3 of Fig. 2.

Experience has indicated that a positive mechanical drive of the pistons 14 is not satisfactory since the pistons tend to bind against the cylinder walls. This either produces distortion or breakage. However, we find that by pneumatically driving the pistons 14 they slide easily within the cylinders and no trouble is encountered in this respect. The cover 18 provides an enclosure which through the medium of opening 24 therein enables air, for example, under pressure, atmospheric pressure or suction pressure to be created within the interior of the casing formed by the plate 2 and cover 18. The opening 24, shown in Fig. 3, is connected by piping 25 to a suitable valve mechanism hereinafter described which controls the pressure surrounding the reservoir 12.

As above described, the piston 22 and stem 23 form a stop for the discharge stroke of the pistons 14, the upper end of the piston bearing against the under-surface of plate 7 and the piston being, for example, of square or polygonal cross-section to enable the fluid to flow thereabout. To obtain a suction or reduction in pressure in the discharge passage defined by the grooves 3 so as to remove the drop which may form at the end of the discharge pipe 5, we employ the piston 22 for this purpose. A small groove or re-entrant portion 26 is formed in the under-surface of plate 7 within which the under end of piston 22 projects to bear against the bottom thereof when the plate 7 lies at the end of its forward stroke wherein it connects the grooves 3 with the outlet openings 4. While the plates are in this position, loading of the ampules takes place. Thereafter the plate 7 is moved in the opposite direction forcing the piston 22 downwardly to a slight extent depending upon the depth of groove 26, and thereby moving the piston 14 slightly downward, and thereby creating sufficient suction as to cause any drop of liquid at the end of the discharge pipe to be drawn therewithin.

As illustrated, the front of the cover 18 may be provided with a transparent window 27 which lies in a fluid tight encasement with a cover and enables the operator to inspect the cylinders therewithin.

The outlet openings 4 in the plate 2 communicate with a slender discharge pipe 28 which, in the illustrated embodiment, is secured within an opening in plate 2 by means of a suitable bushing. The plurality of aligned discharge pipes are preferably surrounded by a rectangular casing 30 which extends along the entire length of the discharge pipe to enclose the upper ends thereof and sleeves 31 differ therefrom in surrounding relation to the individual pipes. Preferably, the cavity defined by the plate 2 and casing 30 is supplied with carbon dioxide or other similar gas which is caused to flow downwardly around the discharge pipes 29 to provide a germ free atmosphere about the necks of the ampules.

The ampules indicated generally at 32 are preferably end loaded in a suitable clip 33. A tray 34 generally of L-shaped cross-section is mounted on lever arms 35 which are pivotally supported as at 36 on the frame of the machine. An adjustable stop limits the downward movement of the tray and permits it to be lowered sufficiently to enable the ampules to be mounted beneath and in alignment with the discharge pipes 29. To insure alignment, the tray 34 is provided by an outstanding serrated member 35 which is designed accurately to align the ampules with the discharge pipes. Before the tray is moved upwardly to pass the discharge pipes within the necks of the ampules as illustrated, the clip is positioned on the tray to place the necks of the ampules within the recesses of the serrated member. A bail 36 is pivoted at the upper end of the tray 34 as indicated at 37 and comprises a slender rod adapted to engage the necks of the ampules, and press them into firm engagement within the serrations of member 35. The bail and serrated member therefore serve to insure accurate alignment which may be maintained while the tray is moved upwardly to cause the ampules to receive the discharge pipes. A tension spring 38 normally urges the bail outwardly from the ampules.

The driving mechanism which effects a predetermined sequence of operations of the various parts of our dispensing machine throughout one cycle of operation thereof comprises an electric motor 39, the output of which drives a suitable gear reduction mechanism 40, which in turn drives the vertical shaft 41 through gears 42. Shaft 41 drives a cam or eccentric 43, see also Fig. 1, which is secured to the upper end thereof. A crank rod 44 is driven by the cam or eccentric 43, and is connected by stud 45 to one end of plate 7. The eccentric is designed to produce longitudinal movement of plate 7 with respect to plate 2 and thereby a sequential connection first between grooves 3 and the supply groove 8, and then between grooves 3 and the discharge pipes 29. Thereafter a depression of piston 22 produces a suction effect within the discharge passage of the dispensing machine. To guide the plate 7, suitable rollers 46 serve to constrain the plate 7 in a lateral position and rollers 47 serve to maintain the plate in close sliding contact with the under plate 2. Preferably, a silicone or other inert lubricant is supplied by the plates to insure smooth, fluid tight and slidable engagement therebetween.

Drive shaft 41 is also provided with a cam 48, see Figs. 2 and 3, which engages a cam follower 49 mounted on lever 50 which in turn is pivoted as at 51. The other end of lever 50 has an adjustable stud 52 which is designed to engage and operate a valve 53. A spring 54 normally urges the valve in one direction, while the cam 48 operates it in the opposite direction. The interior of the valve casing is formed with a cylinder 55 within which the land 56 of the valve is slidably fitted. The end ports of the valve which communicate with the cylinder 55 are provided with suitable pipe connections 57 and 58, respectively, one thereof for assembly 57, being connected with a source of fluid such as air under pressure and the other, pipe 58, being connected with atmosphere. This arrangement is preferably provided when the liquid to be dispensed is derived from some source under pressure. If the source of fluid to be dispensed has no appreciable pressure head thereon, that is, is insufficient to force the pistons 14 downwardly within the reservoirs 12, then we propose to connect the pipe 58 with a suitable vacuum source. In any event, the pipes 57 and 58 are connected to pressure sources one on high and one on low value, the differential being sufficient to operate the pistons 14 of the reservoirs.

The intermediate or central port communicating with the cylinder 55 of the valve 53 is connected with the pipe line 25 herein above described. It will be seen that since cam 48 is driven from drive shaft 41 the operation of valve 53 will take place in timed relation to the operation of the remaining mechanisms of the machine.

Figure 6:
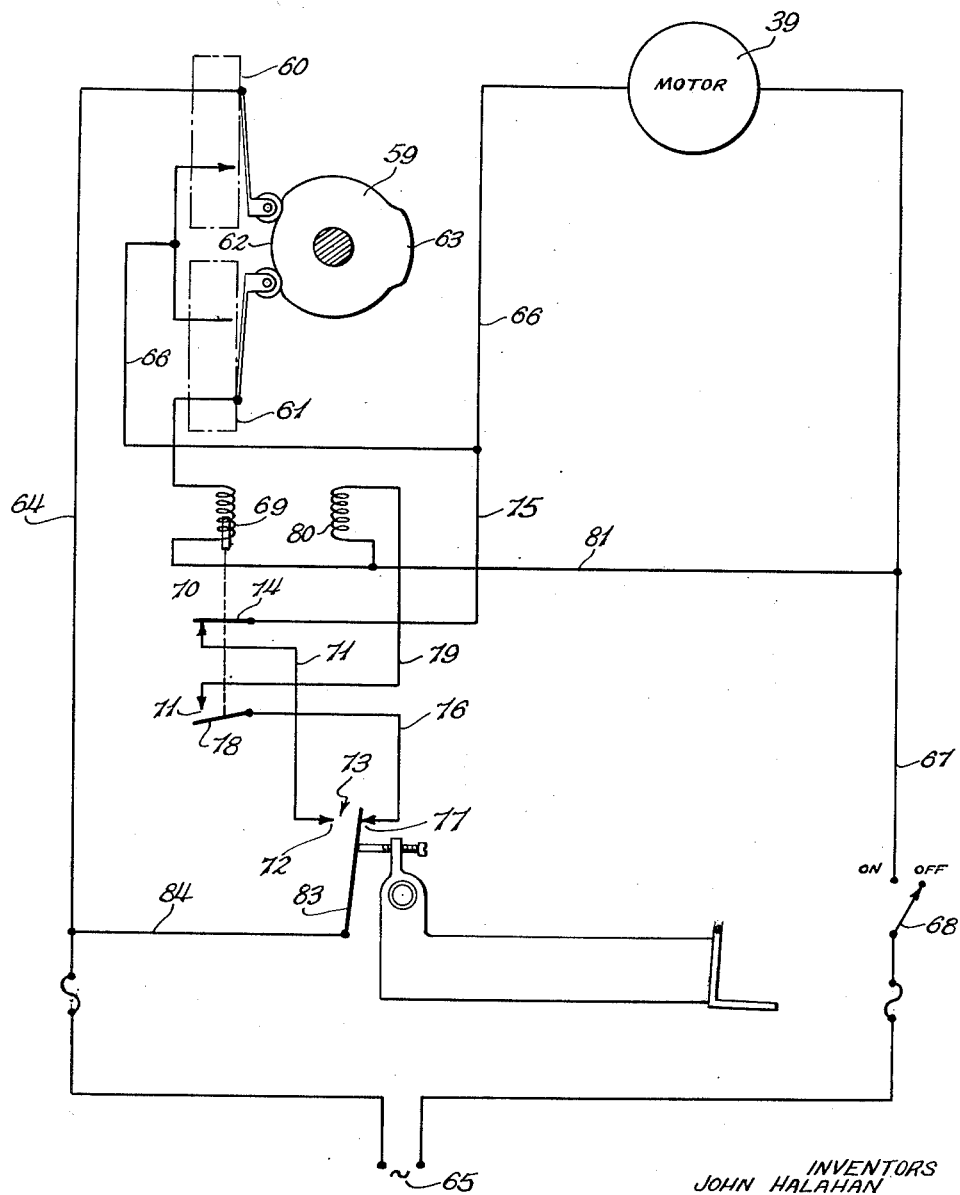
Fig. 6 is a schematic wiring diagram.

The drive shaft 41 also drives a cam 59, see Figs. 2, 3 and 6, which operates through the medium of cam followers or rollers as shown in Figs. 3 and 6, a pair of micro-switches 60 and 61. These switches serve to insure a continued operation of the machine and a stoppage thereof after one complete cycle. An understanding of which will be best appreciated in connection with Fig. 6.

The cam 59, as shown in Fig. 6, comprises a reentrant cam surface 62 and a cam boss 63. One side of switch 60 is connected by lead 64 to one side of the alternating current means 65. While the other side of switch 60 is connected by lead 66 to one side of motor 39. The other side of motor 39 is connected by lead 67 and main switch 68 to the other side of alternating current means 65. One side of switch 61 is connected with the lead 66 and the other side thereof is connected with the field winding 69 of a relay of the self-latching type, that is, a relay which when actuated will lock in its actuated position. The field 69 of the relay serves to operate an armature comprising two switches 70 and 71. The contact of switch 70 is connected by lead 71 to one contact 72 of a double-throw single-pole switch indicated generally at 73. The armature 74 of the relay which is comprised in switch 70 is connected by lead 75 to lead 66. The armature 78 of switch 71 is connected by lead 79 to a releasing field winding 80 of the relay, the other end of which is connected to lead 81, which connects both ends of the armature field windings with the lead 67.

The operation of the dispensing machine as effected automatically by the above described circuit is as follows:

Assume the beginning of a cycle and further assume that the reservoirs 12 are filled with a fluid or liquid to be dispensed. Cam 59 will occupy the position shown in Fig. 6 while the valve 53 will place the interior of the casing surrounding the reservoirs 12 and communicate with the fluid such as air under pressure. When the ampules are loaded upon the tray and the tray is moved upwardly into loading position, the adjustable stud 82 on the lever arm 35 supporting the tray will operate switch 73 by engaging the switch on 83 thereof, which is connected by lead 84 to lead 64, into engagement with contact 72. Since the relay is unenergized, a circuit through switch 70 of the relay to one side of the motor will be established. Since the other side of the motor is permanently connected with the opposite side of the alternating current supply means it will commence operating. In so doing, cam 59 will be rotated to effect a closing of switch 60 whereupon the initial starting circuit of the motor is shunted and continued operation of the motor is thereby insured. Thereafter the cam follower of switch 61 will be forced out of the reentrant cam position and subsequently when it is engaged by the cam boss 63 will effect a closure of switch 61. Switch 61 energizes the field winding 69 of the relay thereby opening the initial motor starting circuit and closing circuit through the relay-release coil 80. However, since in normal operation the circuit to coil 80 will not be closed through the switch 73, the field coil 80 remains unenergized. As the machine continued throughout its cycle of operation, switch 61 will open, thereby de-energizing the relay winding 69 and subsequently switch 60 will open, thereby opening the circuit to the motor. Under these circumstances it will be necessary for the operator to move the tray downwardly and thereby energize the relay-release winding 80 before it is again possible to commence a new cycle of operation by raising the tray into ampule filling position. From the foregoing it will be seen that the machine, once started, must complete one full cycle before it is stopped.

It will be also noted that the valve 53 is operated in timed relation to the movements of the plate 7 with respect to plate 2 to effect either a filling of the reservoirs with the fluid to be dispensed, or to effect a discharger stroke of the pistons within the reservoirs to thereby dispense a measured quantity of fluid or liquid. During the dispensing position of the operation of the machine, the plates 2 and 7 will occupy the relative positions shown in Fig. 2, while fluid such as air under pressure is admitted to casing surrounding the reservoirs to force the pistons 14 along their discharge stroke. Thereafter, plate 7 moves rearwardly, depressing the piston 22 to suck back any drop of liquid at the end of the discharge pipes. Continued movement of the pipe rearwardly effects a valve action, cutting off communication between the grooves 3 and the discharge pipe 29 and subsequently connecting the grooves 3 with the supply grooves 8. When the plate 7 is in the latter position, either the pressure of the fluid supply feeding the liquid or fluid to the grooves 8 is relied upon to force the pistons 14 downwardly within the reservoirs or else the interior of the casing surrounding the reservoirs is connected with a suitable source of vacuum sufficient to perform the same operation. After the reservoirs have been replenished, the plate 7 is again moved forward to the position shown in Fig. 2. Of course the operation of the electrical circuit is timed with the valving operations of the dispensing machine to effect a complete cycle without interruption which includes the replenishing of the supply of fluid within the reservoirs and a discharge therefrom of a measured quantity to the ampule on the tray.

While we have described our invention in its preferred embodiment it is to be understood that the words which we have used are words of description rather than words of limitation and changes may be made within purview of the appended claims without imparting from the true scope and spirit of our invention in its broader aspect.

What is claimed is:

1. A dispensing machine comprising a plurality of staggered fluid reservoirs in a pressure chamber, means defining a dispensing orifice, means comprising a pair of grooved reciprocating plates defining a valved discharge passage connecting said reservoir and orifice, said last means also defining a valved fluid inlet passage connecting with said reservoirs, means for controlling the flow of fluid alternately through said inlet and discharge passages, means for applying pressure to said reservoirs for discharging a measured quantity therefrom, and means for operating said valve means and said discharging means in timed relation alternately to admit fluid from said inlet passage to said reservoirs and to operate said fluid-discharging means when the discharge passage is connected by said valve means with said dispensing orifice.

2. In a dispensing machine comprising a fluid reservoir, a first plate having longitudinally extending grooves therein communicating with said reservoir, discharge passages in said plate terminating at one end in ports longitudinally spaced from one end of said grooves, a transversely extending groove in said plate in spaced relation to the other end of said longitudinal grooves, means for supplying a fluid to said transverse groove, a second plate longitudinally slidable on said first plate and having spaced rows of grooves therein, one row being disposed and of a length to connect the longitudinal grooves of the first plate respectively with the discharge ports at the first end of the stroke of said second plate and to cut off communication at the second end of said stroke and the other row being disposed and of a length to connect the longitudinal grooves of the first plate with the transverse groove when the plate is at the second end of its stroke and to cut off communication therebetween at the first end of said stroke, and means for stroking said second plate.

3. In a dispensing machine comprising a plurality of fluid reservoirs, a first plate having longitudinally extending grooves therein respectively communicating with said reservoirs, and from discharge passages in said plate terminating at one end in ports longitudinally spaced from one end of said grooves, a transversely extending groove in said plate in spaced relation to the other end of said longitudinal grooves, means for supplying a fluid to said transverse groove, a second plate longitudinally slidable on said first plate and having spaced rows of grooves therein, one row being disposed and of a length to connect the longitudinal grooves of the first plate respectively with the discharge ports at the first end of the stroke of said second plate and to cut off communication at the second end of said stroke and the other row being disposed and of a length to connect the longitudinal grooves of the first plate with the transverse groove when the plate is at the second end of its stroke and to cut off communication therebetween at the first end of said stroke, and means for stroking said second plate.

4. In a dispensing machine comprising a fluid reservoir, a first plate having longitudinally extending grooves therein communicating with said reservoir, discharge passages in said plate terminating at one end in ports longitudinally spaced from one end of said grooves and a T-shaped groove in said plate having transversely and longitudinally extending portions disposed in spaced relation to the other end of said longitudinal grooves, and from a second plate longitudinally slidable on said first plate and having spaced rows of grooves therein, one row being disposed and of a length to connect the longitudinal grooves of the first plate respectively with the discharge ports at the first end of the stroke of said second plate and to cut off communication at the second end of said stroke and the other row being disposed and of a length to connect the longitudinal grooves of the first plate with the transverse groove when the plate is at the second end of its stroke and to cut off communication therebetween at the first end of said stroke, means for stroking said second plate, and means terminating in a port in said second plate communicating with the longitudinal portion of said T-shaped groove for supplying fluid thereto.

5. In a dispensing machine, a fluid reservoir comprising a cylinder having a piston slidably fitted therein, a first plate having a groove therein communicating with said reservoir, a second plate slidable along said first plate and defining therebetween a discharge passage, a stop adapted to arrest movement of said piston at the end of its discharge stroke, and means on said second plate for moving said stop to urge said piston in the opposite direction.

6. In a dispensing machine, a fluid reservoir comprising a cylinder having a piston slidably fitted therein, a first plate having a groove therein communicating with said reservoir, a second plate slidable along said first plate and defining therebetween a discharge passage, and a plunger having one end disposed within said cylinder and extending transversely of said passage to abut said second plate, and a recess in said second plate adapted to receive the end of said plunger, whereby, when said second plate is slid along said first plate, said plunger will be forced out of said recess and will move inwardly within said cylinder.

7. In a dispensing machine, a fluid reservoir comprising a cylinder open at one end and provided at its other end with coupling means having a discharge passage extending therethrough, a piston slidably fitted within said cylinder, a plate having a passageway therein and hollow coupling means secured to said plate end communicating with said passageway, the two coupling means serving co-operatively to support said cylinder on said plate, a cover secured to said plate to surround said cylinder and form with said plate a casing closed on all sides thereof, and means for varying the fluid pressure within said casing.

8. In a dispensing machine comprising a fluid reservoir means defining vertically extending dispensing tubes and means including valve means for controlling the flow of fluid to be dispensed in measured quantities to said dispensing tubes, a vertically movable ampule holder comprising an L-shaped tray adapted to support a clip containing a plurality of aligned ampules, a serrated member secured to outstand from the vertical portion of said tray, a bail pivoted to said vertical tray portion and including a member paralleling said tray, and resilient means for biasing said bail.

9. In a dispensing machine, a fluid reservoir, means defining a vertically extending dispensing tube, means including valve means for controlling the flow of fluid to be dispensed to said dispensing tube, a frame supporting said reservoir and means, an ampule-supporting tray pivoted on said frame to move said ampule into fluid-receiving relation to said dispensing tube and away therefrom, said tray including means for securely positioning said ampule in alignment with said dispensing tube, a motor and means driven thereby for operating said valve means, and switch means operated by said tray for controlling said motor.

10. A dispensing machine comprising a plurality of fluid reservoirs, comprising cylinders having pistons fitted therein, a plurality of discharge pipes, means defining valved discharge passages connecting said reservoirs with respective ones of said discharge pipes, valve means for controlling the flow of fluid from said reservoirs and said discharge pipes, a source of operating fluid under pressure, a fluid-tight casing surrounding said reservoirs, means connecting the interior of said casing with said fluid source, valve means for controlling the fluid pressure within said casing, and means for operating all of said valve means in timed relation.

11. A dispensing machine comprising a plurality of fluid reservoirs each including a cylinder having a piston slidably fitted therein, a first plate having a plurality of longitudinally extending grooves therein each communicating respectively with one of said reservoirs, discharge passages in said plate terminating at one end in ports longitudinally spaced from one end of said grooves, a transversely extending groove in said plate in spaced relation to the other end of said longitudinal grooves, means for supplying a fluid to said transverse groove, a second plate longitudinally slidable on said first plate and having spaced rows of grooves therein, one row being disposed and of a length to connect the longitudinal grooves of the first plate respectively with the discharge ports at the first end of the stroke of said second plate and to cut off communication at the second end of said stroke and the other row being disposed and of a length to connect the longitudinal grooves of the first plate with the transverse groove when the plate is at the second end of its stroke and to cut off communication therebetween at the first end of said stroke, means for stroking said second plate, and means for operating the pistons of said reservoir in timed relation to the stroking of said second plate.

12. A dispensing machine of the character recited in claim 11 in which a fluid-tight casing surrounds said reservoirs and the means for operating the pistons of said reservoirs comprises a source of operating fluid under pressure connected with the interior of said casing and valve means for controlling the fluid pressure within said casing.

13. A dispensing machine comprising a plurality of staggered fluid reservoirs each including a cylinder and piston slidably fitted therein, a discharge pipe, grooved plate means defining a valved discharge passage connecting said reservoirs and said discharge pipe, means defining a valved inlet passage for the fluid to be dispensed connecting with said reservoirs, valve means for controlling the flow of said fluid alternately through said inlet and discharge passages, a source of operating fluid under pressure connected with said cylinders to drive said pistons, valve means for controlling the operating fluid pressure at said piston, a motor, and means driven by said motor for operating said valve means in timed relation to effect a discharge of fluid from said reservoirs through said discharge pipe and thereafter a refilling of said reservoir through said inlet passage.

14. A dispensing machine comprising a fluid reservoir including a cylinder and piston slidably fitted therein, a discharge pipe, means defining a valved discharge passage connecting said reservoir and discharge pipe, means defining a valved inlet passage for the fluid to be dispensed connecting with said reservoir, valve means for controlling the flow of said fluid alternately through said inlet and discharge passages, a source of operating fluid under pressure connected with said cylinder to drive said piston, valve means for controlling the operating fluid pressure at said piston, a motor, and means driven by said motor for operating said valve means in timed relation to effect a discharge of fluid from said reservoir through said discharge pipe and thereafter a refilling of said reservoir through said inlet passage, a support for containers to be filled with said fluid, a switch operated by said support for initially energizing said motor, and means for causing said motor thereafter to drive throughout one cycle of operation of said machine and then stop.

JOHN HALAHAN.
THEODORE F. ARONSON.
FLOYD A. LYON.

References Cited in the file of this patent

UNITED STATES PATENTS

| Number | Name | Date |
| --- | --- | --- |
| 482,814 | Smedley | Sept. 20, 1892 |
| 559,540 | Robertson et al. | May 5, 1896 |
| 1,690,067 | Weeks | Oct. 30, 1928 |
| 1,700,494 | Harrington | Jan. 29, 1929 |
| 2,150,760 | Cozzoli | Mar. 14, 1939 |
| 2,193,059 | Chapman | Mar. 12, 1940 |
| 2,195,441 | Bagby | Apr. 2, 1940 |
| 2,319,532 | Codney et al. | May 18, 1943 |
| 2,510,317 | Perkins | June 6, 1950 |
| 2,523,560 | Cozzoli | Sept. 26, 1950 |
| 2,530,230 | Cozzoli | Nov. 14, 1950 |